(12) United States Patent
Hunt et al.

(10) Patent No.: US 6,249,819 B1
(45) Date of Patent: Jun. 19, 2001

(54) METHOD FOR FLOW CONTROLLING ATM TRAFFIC

(75) Inventors: Douglas H. Hunt, Sudbury; Raj Krishnan Nair, Acton, both of MA (US)

(73) Assignees: Fujitsu Network Communications, Inc., Richardson, TX (US); Fujitsu Limited, Kanagawa-ken (JP)

(*) Notice: Subject to any disclaimer, the term of this patent is extended or adjusted under 35 U.S.C. 154(b) by 0 days.

(21) Appl. No.: 08/985,048

(22) Filed: Dec. 4, 1997

Related U.S. Application Data

(60) Provisional application No. 60/032,620, filed on Dec. 6, 1996, and provisional application No. 60/049,538, filed on Jun. 13, 1997.

(51) Int. Cl.[7] .................................................. G06F 15/16
(52) U.S. Cl. ........................ 709/232; 709/226; 709/232; 340/825.5; 370/229; 710/36; 710/58; 710/66
(58) Field of Search ................................. 709/226, 232, 709/235; 340/825.5, 825.33; 710/36, 37, 58, 59, 66; 370/229, 230, 231, 232, 233, 235, 236

(56) References Cited

U.S. PATENT DOCUMENTS

| | | | |
|---|---|---|---|
| 4,849,968 | 7/1989 | Turner | 370/94 |
| 4,897,833 | 1/1990 | Kent et al. | 370/85.2 |
| 5,029,164 | * 7/1991 | Goldstein et al. | 370/95.1 |
| 5,128,932 | 7/1992 | Li | 370/60 |
| 5,166,930 | 11/1992 | Braff et al. | 370/94.1 |
| 5,179,556 | 1/1993 | Turner | 370/94.1 |
| 5,258,979 | 11/1993 | Oomuro et al. | 370/95.1 |
| 5,280,470 | 1/1994 | Buhrke et al. | 370/13 |
| 5,289,462 | 2/1994 | Ahmadi et al. | 370/60.1 |
| 5,289,463 | 2/1994 | Mobasser | 370/68.1 |
| 5,291,481 | 3/1994 | Doshi et al. | 370/60 |
| 5,313,454 | 5/1994 | Bustini et al. | 370/13 |
| 5,319,638 | 6/1994 | Lin | 370/60 |
| 5,341,373 | 8/1994 | Ishibashi et al. | 370/85.9 |
| 5,367,520 | 11/1994 | Cordell | 370/60 |
| 5,371,893 | 12/1994 | Price et al. | 395/725 |
| 5,377,327 | 12/1994 | Jain et al. | 395/200 |
| 5,392,280 | 2/1995 | Zheng | 370/60 |
| 5,432,784 | 7/1995 | Ozveren | 370/60.1 |
| 5,432,824 | * 7/1995 | Zheng et al. | 375/356 |
| 5,463,775 | 10/1995 | DeWitt et al. | 395/184.01 |
| 5,491,694 | 2/1996 | Oliver et al. | 370/85.4 |
| 5,515,359 | 5/1996 | Zheng | 370/13 |
| 5,517,495 | 5/1996 | Lund et al. | 370/60 |

(List continued on next page.)

OTHER PUBLICATIONS

Dynamic Queue Length Thresholds in a Shared Memory ATM Switch Abhijit K. Choudhury and Ellen L. Hahne, AT&T Bell Laboratories, Murray Hill, NJ 07974–0636.

(List continued on next page.)

*Primary Examiner*—Robert B. Harrell
*Assistant Examiner*—Steve Willett
(74) *Attorney, Agent, or Firm*—Weingarten, Schurgin, Gagnebin & Hayes LLP

(57) ABSTRACT

Permission based flow control is implemented in a computer network having at least a downstream, intermediate and upstream network device by receiving credits at the intermediate network device from the downstream network device and granting credits from the intermediate network device to the upstream network device based at least in part upon the credits received at the intermediate network device from the downstream network device. Credit chaining as described above is employed to permit the granting of the right to transmit downstream to be predicated upon buffer availability downstream of the next downstream network device. Via the use of credit chaining, high utilization of network resources is achieved with minimal loss of data traffic.

20 Claims, 3 Drawing Sheets

U.S. PATENT DOCUMENTS

| | | | |
|---|---|---|---|
| 5,528,591 | * | 6/1996 | Lauer .................................. 370/60.1 |
| 5,533,009 | | 7/1996 | Chen ...................................... 370/17 |
| 5,610,745 | * | 3/1997 | Bennett ................................ 359/139 |
| 5,617,409 | * | 4/1997 | Ozveren et al. ....................... 370/60 |
| 5,748,613 | * | 5/1998 | Kilk et al. ............................ 370/231 |
| 5,781,533 | * | 7/1998 | Manning et al. .................... 370/236 |
| 5,852,602 | * | 12/1998 | Sugawara ............................ 370/231 |
| 5,953,318 | * | 9/1999 | Nattkemper et al. ................ 370/236 |

OTHER PUBLICATIONS

Design and Performance of Multinet Switch: A Multistage ATM Switch Architecture with Partially Shared Buffers Hyong S. Kim, Member, IEEE.

VLSI Implementations of ATM Buffer Management, Charles Zukowski 7 Tong–Bi Pei Departement of Electrical Engineering Center for Telecommunications Research, Columbia University.

Traffic Characteristics Evaluation of a Shared Buffer ATM Switch Noboru Enco, Toshiya Ohuchi Takahiko Kozaki, Hiroshi Kuwahara and Makoto Mori Central Research Laboratory, Hitachi, Ltd., Totsuka Works, Hitachi, Ltd.

Methodologies for Bandwidth Allocation, Transmission Scheduling, and Congestion Avoidance in Broadband ATM Networks, K. Sriram Room 3H–607, AT&T bell Laboratories, Holmdel, NJ 07733.

Overflow Analysis for Finite Waiting Room Systems, Roch Guerin, Member, IEEE, and Luke Y. C. Lien.

* cited by examiner

METHOD FOR FLOW CONTROLLING ATM TRAFFIC

CROSS REFERENCE TO RELATED APPLICATIONS

Priority is claimed to U.S. Provisional Application No. 60/032,620, entitled ACHIEVING NETWORK WIDE FAIRNESS IN A CREDIT BASED FLOW CONTROLLED NETWORK, filed Dec. 6, 1996, and U.S. Provisional Patent Application No. 60/049,538, entitled METHOD FOR FLOW CONTROLLING ATM TRAFFIC, filed Jun. 13, 1997.

STATEMENT REGARDING FEDERALLY SPONSORED RESEARCH OR DEVELOPMENT

Not Applicable

BACKGROUND OF THE INVENTION

The present invention is related to flow control in a communications network, and more particularly to credit chaining to control data flow and eliminate data loss.

Broadly, flow control in communications networks can be permission based or non-permission based. In a permission based network, a transmitter obtains permission to transmit from a receiver prior to transmitting data. The permission includes an indication that sufficient buffer space is available at the receiver for receipt of the data. Permissions may be periodically sent as a matter of course or may be in direct response to a request to transmit generated by the transmitter. In a non-permission based network the transmitter operates without explicit advance indication that sufficient buffer space is available at the receiver. Permission based flow control provides improved accuracy and control relative to non-permission based flow control, and in particular allows for a service that avoids loss due to network congestion.

One known type of permission based flow control is Quantum Flow Control ("QFC"). QFC supports an Available Bit Rate ("ABR") service in an Asynchronous Transfer Mode ("ATM") network by controlling the number of ATM cells buffered at each device in a connection. In particular, QFC is applied to each flow through an input port and associated buffer in a receiving device to assure that sufficient buffer space is available.

Implementation of QFC avoids ATM cell loss due to network congestion. However, devices that are primarily output buffered present a difficulty because flows from a plurality of input ports in the device may converge upon a single output port and associated output buffer. The calculations necessary to avoid cell loss in the output buffered device consequently involve a many (transmitters):1 (receiver) relation, rather than the 1 (transmitter):1 (receiver) relation in the case of a primarily input buffered device. It is known to alleviate this problem by partitioning each output buffer to create one partition for each input port. However, the use of reserved buffer partitions can result in inefficient underusage of overall buffer space because unused but dedicated partitions are unavailable for use by other ports and flows. Further, the requisite overall buffer size grows as the number of input ports increases, and hence may not scale well in some device configurations.

BRIEF SUMMARY OF THE INVENTION

In accordance with the present invention, credits are chained between network devices. In a network with an intermediate network device, a network device that is upstream relative to the intermediate network device, and a network device that is downstream relative to the intermediate network device, credits are provided from the intermediate network device to the upstream network device based at least in part upon credits provided from the downstream network device to the intermediate network device. In order to achieve more efficient buffer utilization in some node architectures, e.g., output buffered architectures, credits may be chained as described above through each network device from the final destination device to the initial source device, thereby assuring sufficient buffer space to accommodate the data unit throughout the network prior to transmission from the initial source device. Alternatively, credits may be chained through fewer than each network device from the final destination device to the initial source device.

Credit chaining provides more efficient sharing of buffers among flows and prevents flows from becoming deadlocked. Some known flow control protocols dedicate a predetermined amount of buffer space to each individual flow. The dedicated buffer space is unavailable for use by other flows, even in the case where the flow to which the buffer space is dedicated is not utilizing the buffer space. More efficient buffer sharing is provided by credit chaining. Buffer sharing is implemented by preventing each individual flow from utilizing more than a predetermined proportional amount of buffering for storage at any network element at any time. The proportional amount is dynamically adjusted to ensure that each flow receives a "fair" proportion of the buffer space. Flows are prevented from becoming deadlocked because permission to forward traffic to devices further downstream than the next hop is obtained in advance. Advantageously, buffering requirements in network devices that implement credit chaining scale well as the number of ports and flows increases.

BRIEF DESCRIPTION OF THE DRAWING

The invention will be more fully understood in view of the following Detailed Description of the Invention, in conjunction with the Drawing, of which.

DETAILED DESCRIPTION OF THE INVENTION

U.S. Provisional Application No. 60/032,620, entitled ACHIEVING NETWORK WIDE FAIRNESS IN A CREDIT BASED FLOW CONTROLLED NETWORK, filed Dec. 6, 1996, and U.S. Provisional Patent Application No. 60/049,538, entitled METHOD FOR FLOW CONTROLLING ATM TRAFFIC, filed Jun. 13, 1997 are both incorporated herein by reference.

Figure 1:
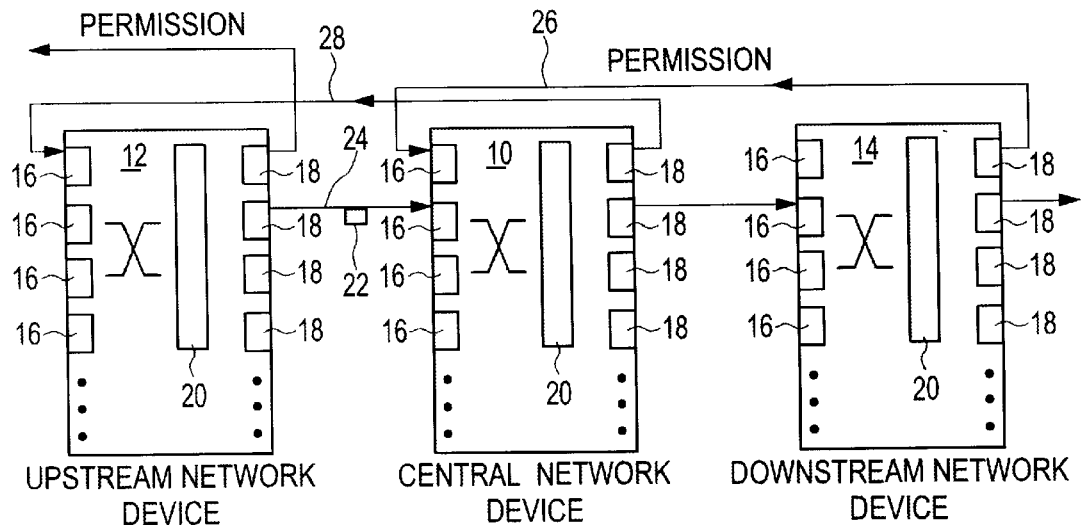
FIG. 1 is a block diagram of credit chaining in a single flow.

Referring to FIG. 1, a communications network includes a plurality of network devices such as a bridges, routers and switches. In the illustrated embodiment a central network device 10 is coupled with an upstream network device 12 and a downstream network device 14. Each network device includes a plurality of input ports 16, a plurality of output ports 18 and a buffer pool 20. A data unit 22 associated with a flow 24 such as a cell over a virtual connection in an Asynchronous Transfer Mode ("ATM") network is transmitted from an output port 18 of the upstream network device 12 to an input port 16 of the central network device 10, then to an output port 18 of the central network device 10, and then to an input port 16 of the downstream network device 14. The data unit 22 is stored in the buffer pool 20, which is shared among a plurality of flows when in the central network device 10.

A permission based flow control protocol such as Quantum Flow Control ("QFC") is implemented to facilitate operation of the communications network. QFC is a protocol for regulating data unit traffic in a communications network such as an ATM network to avoid data unit (ATM cell) loss due to network congestion. In order to avoid cell loss QFC employs explicit advance indication of buffer availability within a receiving network device to control upstream transmitter device access to available resources in the receiving device. Periodically, the receiving network device transmits a permission including "credits" that indicate whether and how much data may be transmitted to the receiving network device.

In a general case, when a receiving network device provides advance indication of buffer availability to a transmitter network device, the receiving network device may need to buffer incoming data until such time as the receiving network device is provided with an indication of downstream buffer availability. When credit chaining is implemented the receiving network device waits for an advance indication from downstream prior to sending an advance indication upstream. This allows for the forwarding of some or possibly all of the received data to be limited only by the scheduling policy, and not by availability of buffers downstream.

In accordance with the QFC protocol in the illustrated embodiment a permission 26 is transmitted from downstream network device 14 to central network device 10 indicating a number of transmission credits before the central network device 10 transmits the data unit 22 to the downstream network device 14. Further, a permission 28 is transmitted from central network device 10 to upstream network device 12 indicating a number of transmission credits before the upstream network device 12 transmits the data unit 22 to the central network device 10. In accordance with credit chaining, the credits in the permission 28 provided by the central network device 10 to the upstream network device 12 are based at least in part on the credits in the permission 26 provided to the central network device 10 by the downstream network device 14. Hence, advance indication of buffer availability in both the central network device 10 and the downstream network device 14 is provided before the data unit 22 is transmitted from the upstream device 12, and the flow 24 is permitted to transmit to the central network device 10 only if credits have been reported to the central network device from the downstream device. It should be noted however that the permission to forward traffic further downstream may include provision for temporarily holding data units in buffers, i.e., permission does not necessarily indicate that bandwidth is available for uninterrupted transmission from initial source to final destination.

Credit chaining advantageously provides sharing of all buffers 20 among flows and prevents flows from becoming deadlocked. Buffer sharing is provided because each individual flow is prevented from utilizing more than a predetermined proportional amount of buffer space for storage at any network element at any time. Deadlocks cannot occur because permission to forward traffic further downstream is obtained in advance. In addition, the buffering requirements in each network device scale effectively as the number of ports and flows increases. While some latency may be incurred before data units associated with a flow can be permitted to transmit as a consequence of credit chaining, this latency should normally be on the order of the propagation delays between network devices. In a worst case scenario the latency is on the order of one-half a round trip time.

Figure 2:
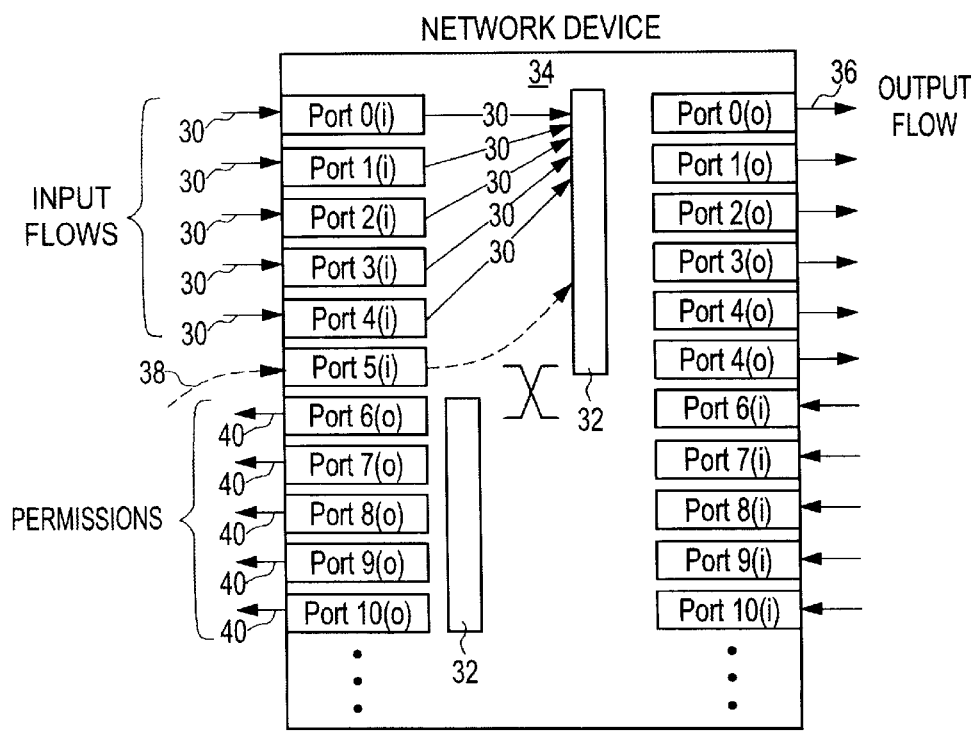
FIG. 2 is a block diagram of credit allocation when multiple flows converge upon a single buffer in a network device.

Referring to FIG. 2, credit chaining may be employed within a network device 34 to assure buffer sharing and prevent deadlock when a plurality of flows converge on a shared buffer in a network device, such as in multipoint-to-point operation. The illustrated network device 34 supports a plurality of input flows 30 that feed into a shared output buffer 32 and form an output flow 36 that drains the shared buffer 32. The network device 34 controls the allocation of buffer space to the upstream flows 30 via a credit based flow control protocol such as QFC. Further, the credits provided to the upstream flows 30 are set based at least in part upon the credits provided for the output flow 36. Since there are four upstream flows 30, each upstream flow 30 may be provided with a portion of the credits provided to the output flow 36. However, the credit allocation to the upstream flows 30 may be reduced if the resultant buffer usage would deadlock another flow 38 associated with the network device 34. In the exemplary embodiment, the credits in permissions 40 provided in association with the upstream flows 30 are in proportion to the relative buffer usage and drain rate of the output flow 36 as a congestion avoidance strategy, although any desirable credit allocation technique may be employed.

Figure 3:
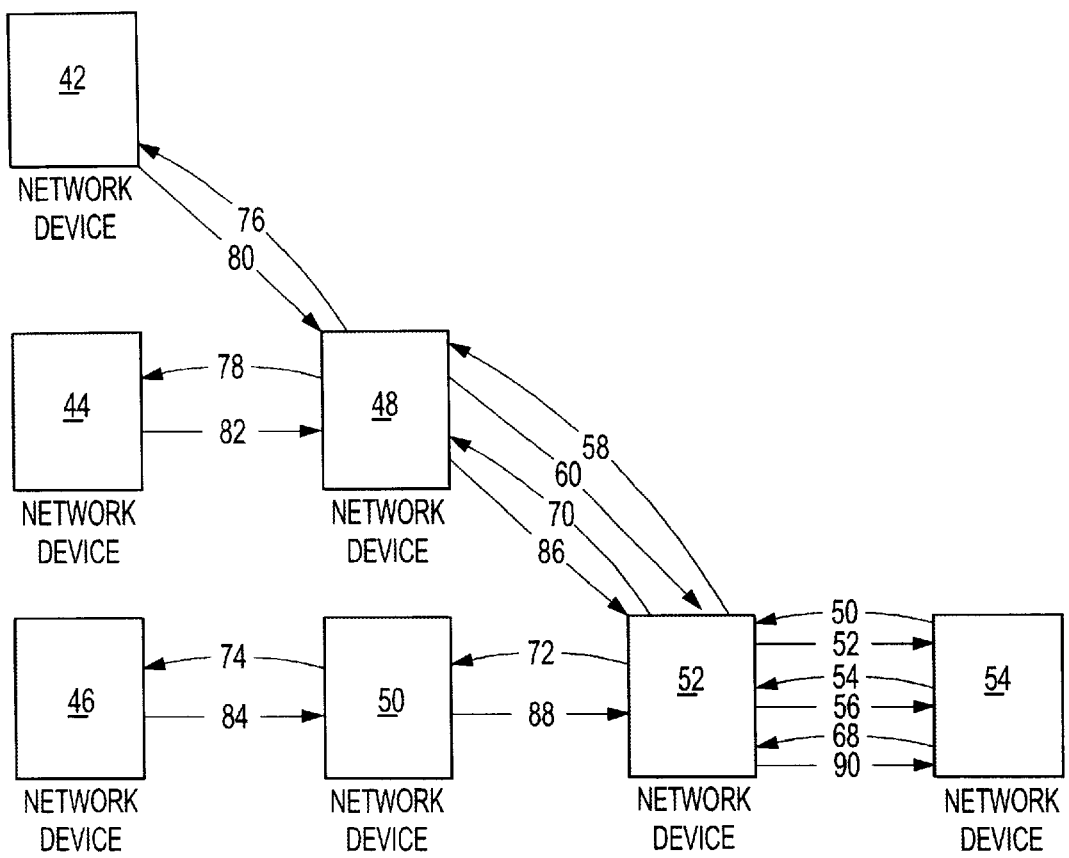
FIG. 3 is a block diagram of network-wide credit chaining.

Referring to FIG. 3, in one embodiment credit chaining is implemented in each network device 42, 44, 46, 48, 50, 52, 54 in a communications network, where devices 42, 44, 46 are initial sources and device 54 is the final destination. When implemented as a network-wide policy, credit chaining can provide fair allocation of available buffer space without constraint of instantaneous access to buffer space. In the illustrated example, a permission 68 indicating a number of credits for connection 90, a permission 50 indicating a number of credits for connection 52 and a permission 54 indicating a number of credits for connection 56 are provided to intermediate device 52 from final destination device 54. Intermediate device 52 distributes the credits of permission 50 to network device 48 via permission 58 for connection 60. Device 52 also distributes the credits of permission 68 to network device 48 via permission 70 for connection 86, and distributes the credits of permission 54 to device 50 via permission 72 for connection 88. At the connection level, the number of credits given in permissions 58, 70 and 72 do not exceed the number of credits in permissions 50, 68 and 54, respectively. At the logical link level network device 52 may be configured to be oversubscribed, such as by granting network device 48 and network device 50 a number of credits that may exceed the size of the logical link buffer in device 52. In such a configuration the connection level credits may be used to avoid overflow of the logical link buffer in device 52. It should be noted however that in alternative embodiments connection level oversubscription or any other desirable policy could be employed such that the number of credits given in permission 58 would be greater than the number of credits in permission 50, the number of credits given in permission 70 would be greater than the number of credits in permission 68, and the number of credits given in permission 72 would be greater than the number of credits in permission 54. In response to the permission 72 provided to intermediate device 50 by intermediate device 52, a permission 74 is generated by intermediate device 50 and provided to intermediate device 46 for connection 84. In the illustrated embodiment the number of credits given in permission 74 at the connection level is less than or equal to the number of credits in permission 72. Intermediate device 48 distributes the credits of permission 58 to intermediate device 42 via permission 76 for connection 80. Similarly, intermediate device 48 distributes the credits of permission 70 to intermediate device 44 via permission 78 for connection 82. In the illustrated embodiment the number of credits given in permission 76 and permission 78 at the connection level is less than or equal to the number of credits in permission 58 and permission 70, respectively.

When each of the initial source devices 42, 44, 46 has received a permission, data units are transmitted along the respective connections. In particular, data units are transmitted from initial source device 42 to intermediate device 48 via connection 80, from initial source device 44 to intermediate device 48 via connection 82, and from initial source device 46 to intermediate device 50 via connection 84. In the illustrated embodiment the transmission on connection 80 is quantitatively less than or equal to the credits in permission 76. Similarly, in the illustrated embodiment the transmissions on connections 82 and 84 are less than or equal to the credits in permissions 78 and 74. Transmission on connection 86 is quantitatively less than or equal to the credits in permission 70, transmission on connection 60 is less than or equal to the credits in permission 58 and transmission on connection 88 is less than or equal to the credits in permission 72. Finally, transmission on connection 52 is less than or equal to the credits in permission 50, transmission on connection 56 is less than or equal to the credits in permission 54 and transmission on connection 90 is quantitatively less than or equal to the credits in permission 68. Hence, via the presently disclosed credit chaining technique output buffers are shared and buffer availability is assured prior to data unit transmission.

Figure 4:
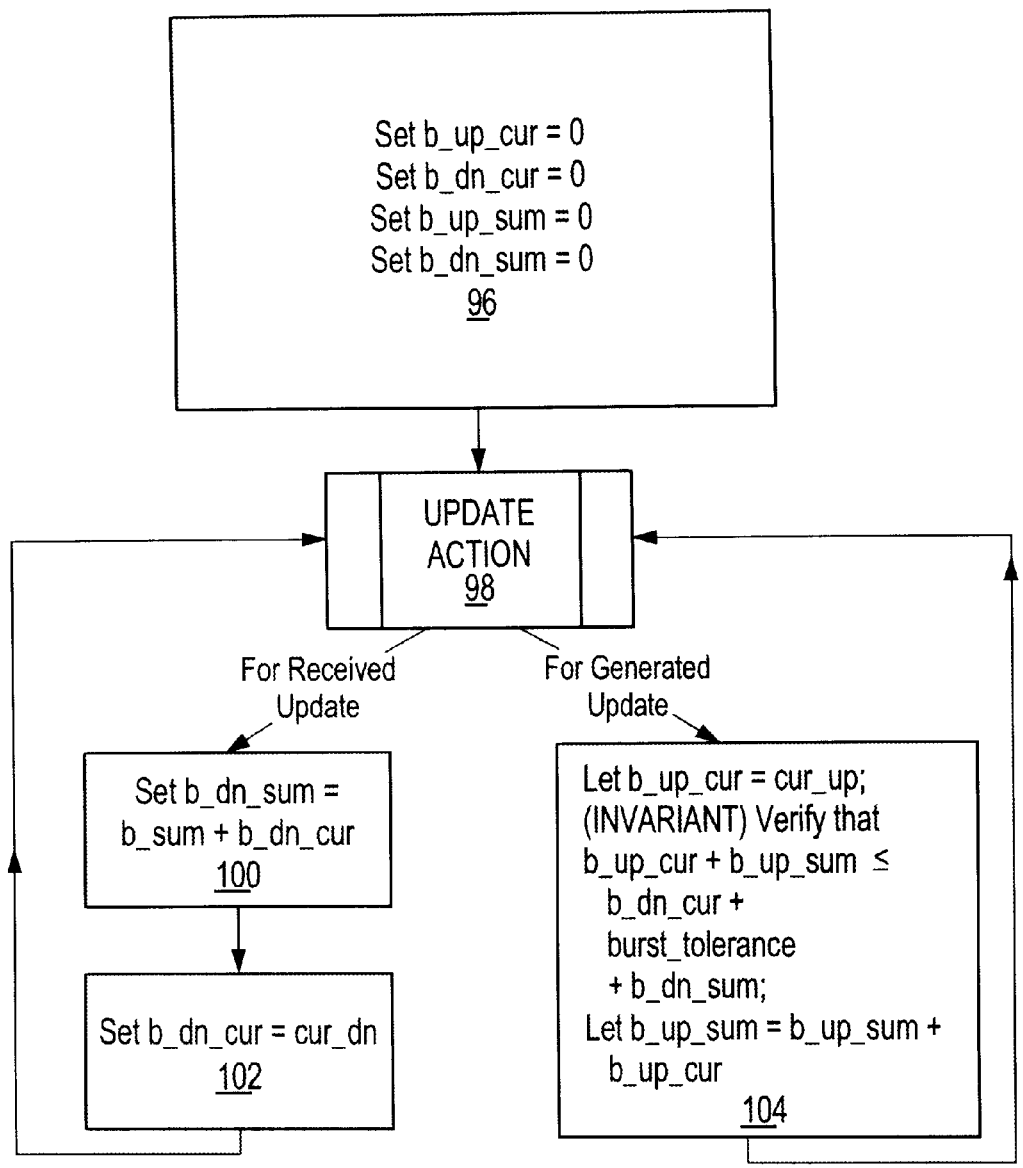
FIG. 4 is a flow diagram that illustrates a method of credit chaining.

FIG. 4 illustrates an exemplary method for implementing credit chaining. In accordance with the illustrated method, buffer allocation fairness is based on burst-level buffer availability. The disclosed method does not constrain instantaneous bandwidth access. For the purposes of illustrating this method, access to available bandwidth is assumed to be purely a function of downstream buffer occupancy. Further, forwarding requirements are implemented as defined by the QFC protocol.

The disclosed method operates to ensure that a balance is maintained across buffer state updates that are sent and received so that no more than a predetermined "burst tolerance" amount of buffering can be held at a receiving device at any one time. In particular, burst tolerance (represented by a variable "burst_tolerance") is independently managed within each network device. A state variable "b_up_cur" represents the most recent buffer availability indicator (e.g., permission with credits) sent upstream, and "b_up_sum" represents the sum of buffer availability indicators sent upstream. A state variable "b_dn_cur" represents the most recent buffer availability received from downstream before the update corresponding to "b_up_cur" was sent upstream. A state variable "b_dn_sum" represents the sum of buffer availability received from the downstream device. Initially, b_up_cur, b_down_cur, b_up_sum, and b_dn_sum are set equal to zero as indicated in step 96.

For each received update containing a buffer availability of value "cur_dn," as determined in step 98, the variable "b_dn_sum" is set equal to "b_dn_sum+b_dn_cur" as indicated in step 100. The variable "b_dn_cur" is then set equal to "cur_dn" as indicated in step 102.

For each generated update, as determined in step 98, the buffer availability value "cur_up" in the update is chosen to satisfy the invariant indicated in step 104: Let b_up_cur= cur_up; (INVARIANT) Verify that b_up_cur+b_up_sum≦b_dn_cur+burst_tolerance+b_dn_sum; (allowing up to burst tolerance unless the permission from the next downstream device is less than the burst tolerance) and Let b_up_sum=b_up_sum+b_up_cur; (update sum of buffer availability). Because the sum of the most recent buffer availability indicator sent to the upstream network device combined with the running sum of buffer availability indicators sent to the upstream network device (total buffer availability indicators sent) is less than or equal to the lesser of the most recently received buffer availability indicator and the burst tolerance combined with the running sum of buffer availability indicators received from the downstream network device, sufficient buffer space for handling the data unit throughout the network is assured prior to data unit transmission from the upstream network device.

Having described the preferred embodiments of the invention, other embodiments which incorporate concepts of the invention will now become apparent to one of skill in the art. Therefore, the invention should not be viewed as limited to the disclosed embodiments but rather should be viewed as limited only by the spirit and scope of the appended claims.

What is claimed is:

1. A method for implementing permission based flow control in a computer network having at least first, second and third network devices, where the first network device is downstream relative to the second network device and the third network device is upstream relative to the second network device, and wherein the second network device receives data units from and provides permission credits to the third network device and transmits data units to the first network device and receives permission credits from the first network device, comprising the steps of:

receiving permission credits at the second network device from the first network device; and granting permission credits from the second network device to the third network device based at least in part upon the credits received at the second network device from the first network device, and wherein, at least at some times, the credits granted from the second network device to the third network device are greater than the credits received at the second network device from the first network device, and wherein, at least at some other times, the credits granted from the second network device to the third network device are no greater than the credits received at the second network device from the first network device.

2. The method of claim 1 wherein the first network device is a final destination, and wherein one or more network devices are coupled between the first network device and a source network device, and including, at least at some times, the further step of chaining the credits granted in the granting step through each network device from the first network device to the source network device prior to transmitting any data units from the source network device.

3. The method of claim 1 including the further step of transmitting a request to transmit from the third device to the second device.

4. The method of claim 3 including the further step of, in response to the request transmitted from the third network device to the second network device, transmitting a request to transmit from the second network device to the first network device.

5. The method of claim 4 including the further step of determining a number of credits in the first network device in response to the request to transmit received from the second network device.

6. The method of claim 5, wherein the computer network further includes a fourth network device, the fourth network device located upstream relative to the third network device, and wherein the third network device receives data units from and transmits permission credits to the fourth network device, and including the further step of granting, from the third network device to the fourth network device, less than or equal to the amount of credits received at the third network device from the second network device.

7. The method of claim 6 including the further step of granting, from the third network device to the fourth network device, an amount of credits in proportion to the drain rate of the third network device.

8. A network device for facilitating flow of data within a network including at least one network device that is upstream relative to the facilitating device and at least one network device that is downstream relative to the facilitating device, comprising:
   a flow controller operative in response to a first transmit permission received from the downstream network device, and to provide a corresponding second transmit permission to the upstream network device based at least in part upon the first transmit permission, said first permission including a first number of permission credits, said second permission including a second number of permission credits, and wherein, at least at some times, said second number of permission credits is greater than said first number of permission credits, and wherein, at least at some other times, said second number of permission credits is not greater than said first number of permission credits.

9. The network device of claim 8 wherein said flow controller is further operative, in response to a first request to transmit received from the upstream network device, to generate a second request to transmit which is provided to the downstream network device.

10. The network device of claim 8 wherein said flow controller maintains indications of burst tolerance, a most recent permission credit value sent to the upstream network device, a running sum of permission credit values sent to the upstream network device, a most recent permission credit value received from the downstream network device and a running sum of permission credit values received from the downstream network device.

11. The network device of claim 10 wherein, responsive to a transmit permission received from the downstream network device, the most recent permission credit value received from the downstream network device and the running sum of permission credit values received from the downstream network device are updated.

12. The network device of claim 11 wherein, responsive to a transmit permission provided to the upstream network device, the sum of the most recent permission credit value sent to the upstream network device combined with the sum of permission credit values sent to the upstream network device is less than or equal to the lesser of the most recently received permission credit value and the burst tolerance combined with the sum of permission credit values received from the downstream network device.

13. A method for performing flow control in a credit based flow controlled computer network having at least a first virtual connection for communication first information from a first computer network device to a second computer network device and further for communicating said first information from said second computer network device to a third computer network device and having at least a second virtual connection for communicating second information from said third computer network device to said second computer network device and further for communicating said second information from said second computer network device to said first computer network device, said method comprising the steps of:
   forwarding a first credit message from said third computer network device for receipt by said second computer network device via said second virtual connection, said first credit message including at least a first number of credits indicative of buffer availability within said third computer network device;
   forwarding a second credit message from said second computer network device for receipt by said first computer network device via said second virtual connection, said second credit message including a second number of credits, wherein said second number of credits is based, at least in part, upon the first number of credits contained within said first credit message, and wherein, at least at some times, said second number of credits is greater than said first number of credits, and wherein, at least at some other times, said second number of credits is not greater than said first number of credits; and
   in response to receipt of said second credit message at said first computer network device, transmitting from said first computer network device for receipt by said second computer network device at least some of said first information wherein the amount of said first information transmitted is based, at least in part, upon the second number of credits specified in said second credit message.

14. The method of claim 13 wherein said second number of credits is in proportion to the first number of credits contained within said first credit message.

15. The method of claim 13, wherein the computer network further includes a fourth computer network device, wherein said first virtual circuit is further for communicating said first information from said third computer network device to said fourth computer network device, wherein said second virtual circuit is further for communicating said second information from said fourth computer network device to said third computer network device, and wherein said first number of credits in said first credit message is not greater than a number of credits contained within a third credit message previously received by said third computer network device from said fourth computer network device.

16. The method of claim 13 including the further step of transmitting from said first computer network device for receipt by said second computer network device at least some of said first information wherein the amount of said first information transmitted is proportional to the first number of credits specified in said second credit message.

17. The method of claim 13 including the further step of transmitting from said second computer network device for receipt by said third computer network device at least some of said first information wherein the amount of said first information transmitted is not greater than the first number of credits specified in said first credit message.

18. The method of claim 1, wherein the first network device, second network device and third network device each include at least one input port and at least one output port, and further comprising:

receiving the permission credits received at the second network device at the at least one input port of the second network device;

transmitting the permission credits granted by the second network device at the at least one output port of the second network device; and receiving the permission credits granted by the second network device at the at least one input port of the third network device.

19. The network device of claim 8, further comprising:

at least one input port;

at least one output port; and wherein the first transmit permission received from the downstream network device is received at the at least one input port, and the second transmit permission is transmitted at the at least one output port.

20. A method for implementing permission based flow control in a computer network in which transmission permission credits are chained between network devices, wherein said method includes over-subscription at a logical link level, comprising:

first, second and third network devices, wherein said first network device is downstream relative to said second network device, and said third network device is upstream relative to said second network device, wherein said second network device receives data units from said third network device and transmits permission credits to said third network device, and wherein said second network device transmits data units to said first network device and receives permission credits from said first network device;

wherein said transmission permission credits transmitted from said second network device to said third network device are based at least in part upon transmission permission credits provided from said first network device to said second network device;

wherein said second network device may, at least at sometimes, be over-subscribed at said logical link level by transmitting to said third network device a number of transmission permission credits exceeding a size of a logical link buffer in said second network device; and wherein, at least at some other times, said second network device may transmit to said third network device a number of transmission permission credits not exceeding a size of a logical link buffer in said second network device.

* * * * *